United States Patent
Onishi et al.

(10) Patent No.: US 11,926,263 B2
(45) Date of Patent: Mar. 12, 2024

(54) VEHICLE SURROUNDING AREA IMAGE GENERATION DEVICE, VEHICLE SURROUNDING AREA DISPLAY SYSTEM, AND VEHICLE SURROUNDING AREA DISPLAY METHOD

(71) Applicant: Mitsubishi Electric Corporation, Tokyo (JP)

(72) Inventors: Kenta Onishi, Tokyo (JP); Kohei Mori, Tokyo (JP); Nariaki Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 220 days.

(21) Appl. No.: 17/429,376

(22) PCT Filed: Apr. 18, 2019

(86) PCT No.: PCT/JP2019/016567
§ 371 (c)(1),
(2) Date: Aug. 9, 2021

(87) PCT Pub. No.: WO2020/213111
PCT Pub. Date: Oct. 22, 2020

(65) Prior Publication Data
US 2022/0118907 A1 Apr. 21, 2022

(51) Int. Cl.
*B60Q 1/00* (2006.01)
*B60R 1/27* (2022.01)
*B60R 11/04* (2006.01)

(52) U.S. Cl.
CPC ............... *B60R 1/27* (2022.01); *B60R 11/04* (2013.01); *B60R 2300/105* (2013.01);
(Continued)

(58) Field of Classification Search
CPC ..... B60R 1/00; B60R 11/04; B60R 2300/105; B60R 2300/302; B60R 2300/303;
(Continued)

(56) References Cited

U.S. PATENT DOCUMENTS 5,969,969 A 10/1999 Ejiri et al.
8,417,022 B2 * 4/2013 Morimitsu ............. G01C 11/06
348/153
(Continued)

FOREIGN PATENT DOCUMENTS

DE 10 2009 036 200 A1 5/2010
DE 10 2011 088 332 A1 6/2013
(Continued)

OTHER PUBLICATIONS

International Search Report for PCT/JP2019/016567 dated Jul. 9, 2019.
(Continued)

*Primary Examiner* — Tai T Nguyen
(74) *Attorney, Agent, or Firm* — Sughrue Mion, PLLC; Richard C. Turner (57) ABSTRACT

An ECU generates an overhead image including a vehicle and a vehicle surrounding area, on the basis of a plurality of images taken by a plurality of cameras mounted on the vehicle. When a distance between an object existing in an overlapping portion of imaging areas of the plurality of cameras and the vehicle is within a threshold and the object exists in a traveling direction of the vehicle, the overlapping portion is divided into two pairs of a road surface image and an object image, and combination is performed by alpha blending with an α value for the object image being set to 1 and an α value for the road surface image being set to 0 for an area that is the object image in one of the two pairs
(Continued)

and is the road surface image in the other of the two pairs, to generate the overhead image.

16 Claims, 9 Drawing Sheets

(52) U.S. Cl.
CPC ... *B60R 2300/302* (2013.01); *B60R 2300/303* (2013.01); *B60R 2300/607* (2013.01); *B60R 2300/8093* (2013.01)

(58) Field of Classification Search
CPC ...... B60R 2300/607; B60R 2300/8093; B60R 2300/305; B60R 1/27; G06T 3/4038; H04N 7/181
USPC ......................................................... 340/435
See application file for complete search history.

(56) References Cited

U.S. PATENT DOCUMENTS

| | | | |
|---|---|---|---|
| 9,428,192 B2* | 8/2016 | Schofield | ............... G08G 1/167 |
| 9,436,880 B2* | 9/2016 | Bos | ....................... G01B 11/026 |
| 10,685,239 B2* | 6/2020 | Yan | ...................... G06V 10/757 |
| 2012/0121136 A1 | 5/2012 | Gloger et al. | |
| 2014/0198184 A1* | 7/2014 | Stein | ....................... G06V 20/56 |
| | | | 348/47 |
| 2016/0129907 A1* | 5/2016 | Kim | ....................... G08G 1/167 |
| | | | 701/26 |
| 2019/0215465 A1 | 7/2019 | Hayashi et al. | |
| 2019/0299782 A1* | 10/2019 | Yamashita | ................ B60R 1/00 |
| 2020/0302657 A1* | 9/2020 | Shimazu | .................. H04N 7/18 |

FOREIGN PATENT DOCUMENTS

| | | |
|---|---|---|
| JP | 06-267000 A | 9/1994 |
| JP | 2003-169323 A | 6/2003 |
| JP | 2006-253872 A | 9/2006 |
| JP | 2009-289185 A | 12/2009 |
| JP | 2018-142883 A | 9/2018 |

OTHER PUBLICATIONS

Office Action dated Nov. 17, 2022 issued by the German Patent Office in German Application No. 11 2019 007 225.0.
Office Action dated Jul. 26, 2022 in Japanese Application No. 2021-514732.
Office Action dated Nov. 18, 2023 in Chinese Application No. 201980095379.X.

* cited by examiner

VEHICLE SURROUNDING AREA IMAGE GENERATION DEVICE, VEHICLE SURROUNDING AREA DISPLAY SYSTEM, AND VEHICLE SURROUNDING AREA DISPLAY METHOD

CROSS-REFERENCE TO RELATED APPLICATIONS

This application is a National Stage of International Application No. PCT/JP2019/016567 filed Apr. 18, 2019.

TECHNICAL FIELD

The present disclosure relates to a vehicle surrounding area image generation device, a vehicle surrounding area display system, and a vehicle surrounding area display method.

BACKGROUND ART

In a vehicle surrounding area display system including a vehicle surrounding area image generation device, images of a vehicle surrounding area taken by a plurality of on-vehicle cameras are combined to generate an overhead image including the vehicle and the vehicle surrounding area. The driver recognizes a person, an object, or the like existing around the vehicle through the overhead image displayed on a display device. For example, Patent Document 1 indicates that pixel information of each input image is alternately adopted according to a certain rule for the same imaging area included in a plurality of input images, and a composite image is outputted.

When a plurality of images are combined to generate an overhead image, the images overlap at the boundary portion between the imaging areas of two cameras. In the conventional combining method, a combining ratio of each image (hereinafter, referred to as a value) is set to 0<α<1 for this overlapping portion. The technique of combining two images with a certain α value as described above is called alpha blending. In alpha blending, for example, when the α value is set to 0.5, a color that is a mixture of 50% of the colors of the pixels of the overlapping portion in each of two images is generated, and an average image is synthesized.

CITATION LIST

Patent Document

Patent Document 1: Japanese Laid-Open Patent Publication No. 2003-169323

SUMMARY OF THE INVENTION

Problems to be Solved by the Invention

When an overhead image is synthesized in the conventional vehicle surrounding area image generation device, two images are combined by alpha blending with the overlapping portion in each of the two images being made transparent. In this case, the α value is set regardless of whether an object exists in the image. Therefore, there is a problem that a part of an object existing in the overlapping portion of the imaging area of each camera is blurred in the overhead image and thus the overhead image becomes an unclear image. Moreover, in alpha blending, even if the overlapping portion is weighted in proportion to the distance from the center of the imaging area, an object may be blurred.

The present disclosure has been made to solve the above problem, and an object of the present disclosure is to obtain a vehicle surrounding area image generation device capable of generating a clear overhead image without blurring an object existing in an overlapping portion of the imaging areas of a plurality of imaging devices. In addition, another object of the present disclosure is to obtain a vehicle surrounding area display system and a vehicle surrounding area display method capable of clearly displaying an object existing in the overlapping portion of the imaging areas.

Solution to the Problems

A vehicle surrounding area image generation device according to the present disclosure is a vehicle surrounding area image generation device for generating an overhead image including a vehicle and a vehicle surrounding area, on the basis of a plurality of images taken by a plurality of imaging devices mounted on the vehicle, the vehicle surrounding area image generation device including: an object distance determining circuitry to determine whether a distance between an object and the vehicle is within a threshold, on the basis of object information acquired by a sensor for detecting the object in the vehicle surrounding area; an image converting circuitry to convert each of the plurality of images into an image for an overhead image; an image dividing circuitry to divide the overlapping portion in the image for an overhead image into a road surface image and an object image when the object exists in an overlapping portion of imaging areas of the plurality of imaging devices; and an image combining circuitry to combine all or part of the image for an overhead image obtained by the image converting circuitry and the road surface image and the object image obtained by the image dividing circuitry respectively, to generate the overhead image.

A vehicle surrounding area display system according to the present disclosure is a vehicle surrounding area display system including: a plurality of imaging devices, mounted on a vehicle, for taking an image of a vehicle surrounding area; a sensor for detecting an object in the vehicle surrounding area; a vehicle surrounding area image generation device for generating an overhead image including the vehicle and the vehicle surrounding area, on the basis of a plurality of images taken by the imaging devices; and a display for displaying the overhead image generated by the vehicle surrounding area image generation device, wherein the vehicle surrounding area image generation device includes an object distance determining circuitry to determine whether a distance between the object and the vehicle is within a threshold, on the basis of object information acquired by the sensor, an image converting circuitry to convert each of the plurality of images into an image for an overhead image, an image dividing circuitry to divide the overlapping portion in the image for an overhead image into a road surface image and an object image when the object exists in an overlapping portion of imaging areas of the plurality of imaging devices, and an image combining circuitry to combine all or part of the image for an overhead image obtained by the image converting circuitry and the road surface image and the object image obtained by the image dividing circuitry respectively, to generate the overhead image.

A vehicle surrounding area display method according to the present disclosure is a vehicle surrounding area display method for generating and displaying an overhead image including a vehicle and a vehicle surrounding area, the vehicle surrounding area display method including: acquiring image information of a plurality of taken images of the vehicle surrounding area, object information including position information of an object in the vehicle surrounding area, and vehicle traveling information including a traveling direction and a speed of the vehicle; converting each of the acquired plurality of images into an image for an overhead image; detecting a road surface color of the overlapping portion when the object exists in an overlapping portion of the plurality of images and a distance between the object and the vehicle is within a threshold, dividing the overlapping portion in the image for an overhead image into a road surface image and an object image on the basis of the detected road surface color; combining all or part of the image for an overhead image and the road surface image and the object image, to generate the overhead image; and displaying the generated overhead image.

Effect of the Invention

In the vehicle surrounding area image generation device according to the present disclosure, when an object exists in the overlapping portion of the imaging areas of a plurality of cameras, the overlapping portion is divided into a road surface image and an object image, and an image for an overhead image, the road surface image, and the object image are combined to generate an overhead image. Thus, it is possible to generate a clear overhead image without blurring the object existing in the overlapping portion.

In the vehicle surrounding area display system according to the present disclosure, when an object exists in the overlapping portion of the imaging areas of a plurality of cameras, the overlapping portion is divided into a road surface image and an object image, and an image for an overhead image, the road surface image, and the object image are combined to generate an overhead image. Thus, it is possible to display a clear overhead image without blurring the object existing in the overlapping portion.

In the vehicle surrounding area display method according to the present disclosure, when an object exists in the overlapping portion of the imaging areas of the plurality of cameras and the distance between the object and the vehicle is within the threshold, the overlapping portion is divided into a road surface image and an object image, and an image for an overhead image, the road surface image, and the object image are combined to generate an overhead image. Thus, it is possible to display a clear overhead image without blurring the object existing in the overlapping portion.

Objects, features, aspects, and effects of the present disclosure other than the above will become more apparent from the following detailed description with reference to the drawings.

DESCRIPTION OF EMBODIMENTS

Embodiment 1

Figure 1:
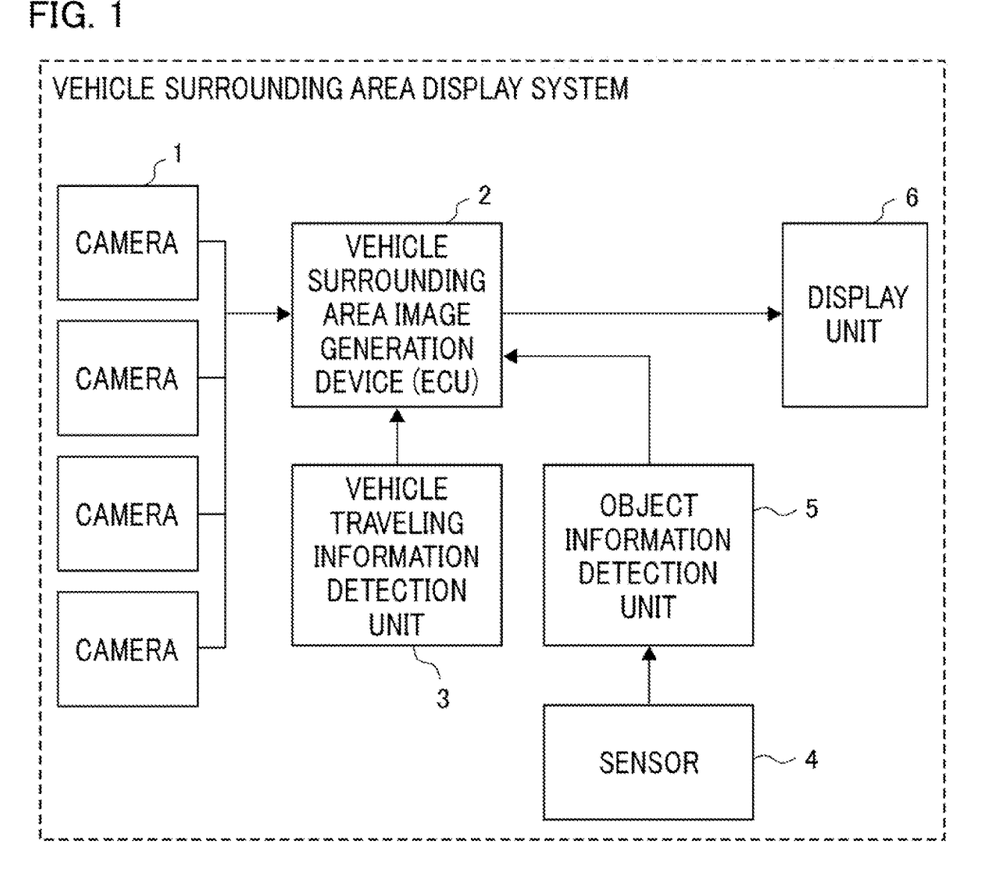
FIG. 1 is a block diagram showing the configuration of a vehicle surrounding area display system according to Embodiment 1.
Figure 2:
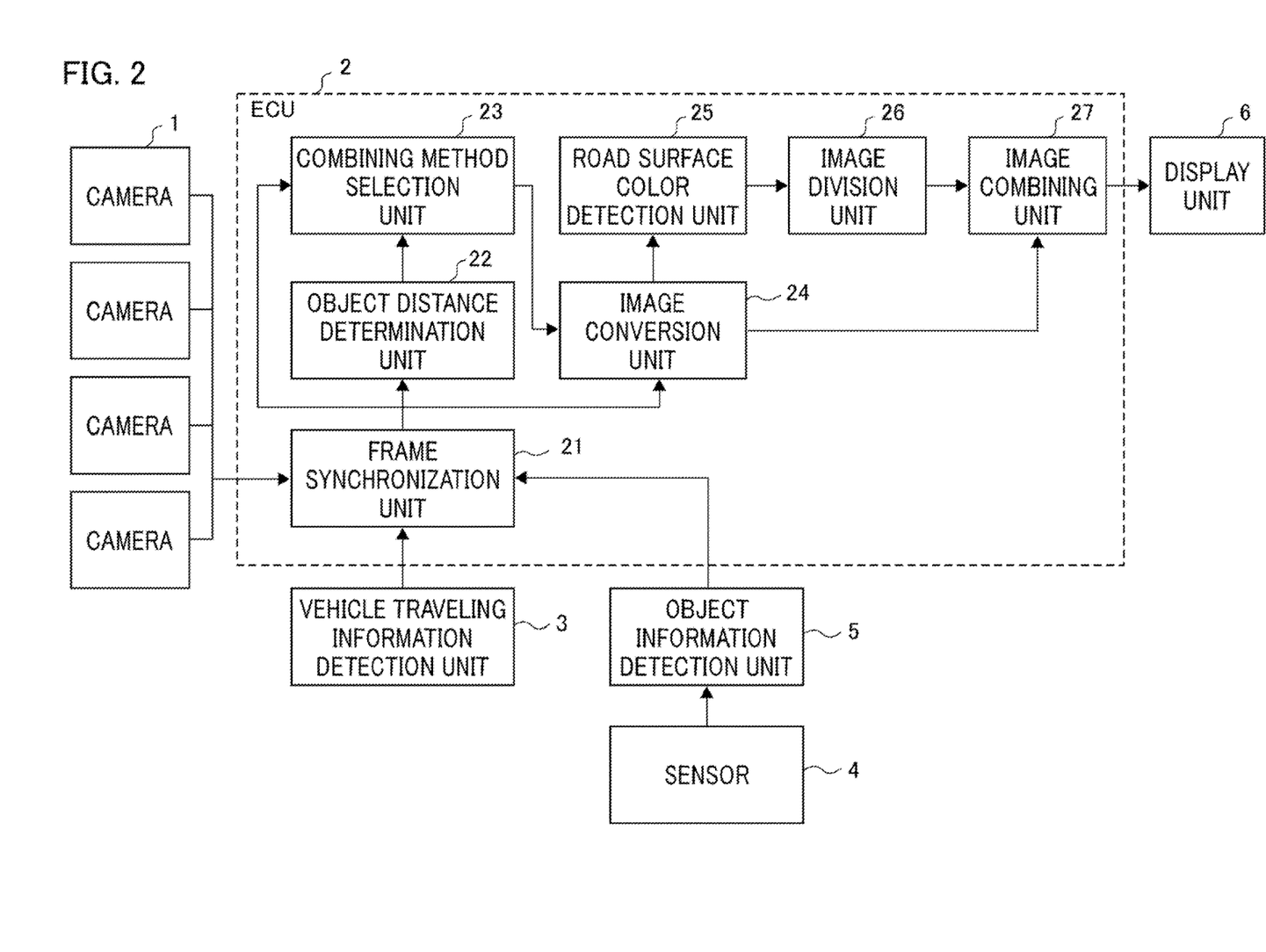
FIG. 2 is a block diagram showing the configuration of a vehicle surrounding area image generation device according to Embodiment 1.
Figure 3:
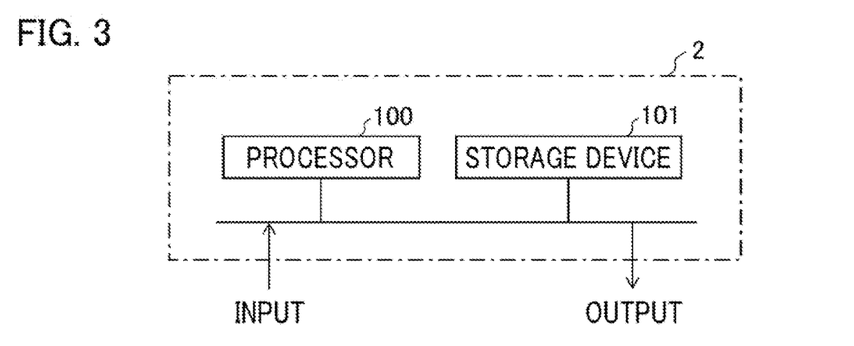
FIG. 3 is a diagram showing a hardware configuration example of the vehicle surrounding area image generation device according to Embodiment 1.
Figure 4:
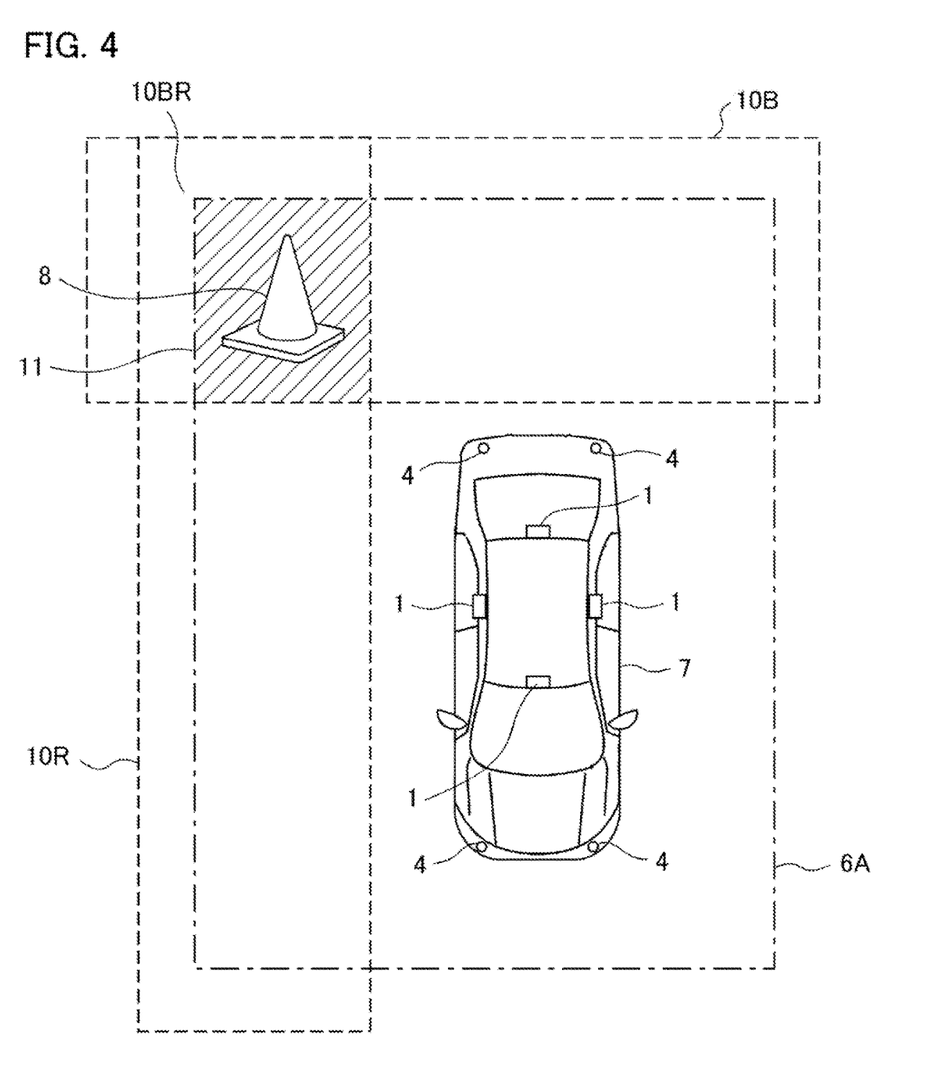
FIG. 4 is a diagram illustrating an image combining method by the vehicle surrounding area image generation device according to Embodiment 1.
Figure 5:
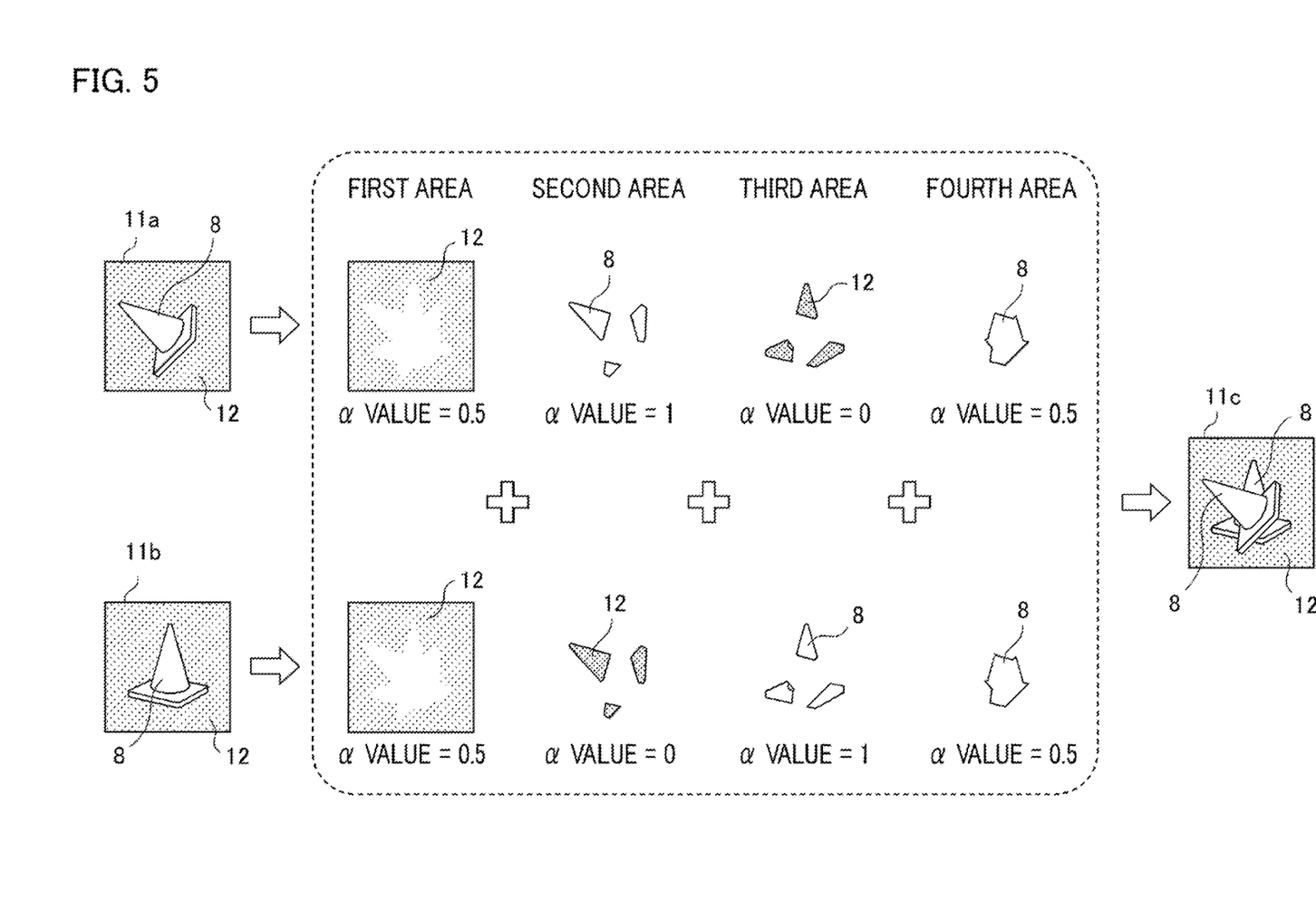
FIG. 5 is a diagram illustrating the image combining method by the vehicle surrounding area image generation device according to Embodiment 1.

Hereinafter, a vehicle surrounding area image generation device and a vehicle surrounding area display system according to Embodiment 1 will be described with reference to the drawings. FIG. 1 is a block diagram showing the configuration of the vehicle surrounding area display system according to Embodiment 1, FIG. 2 is a block diagram showing the configuration of the vehicle surrounding area image generation device according to Embodiment 1, FIG. 3 is a diagram showing a hardware configuration example of the vehicle surrounding area image generation device, and FIG. 4 and FIG. 5 are diagrams illustrating an image combining method by the vehicle surrounding area image generation device. In the drawings, identical and corresponding portions are designated by the same reference characters.

As shown in FIG. 1, the vehicle surrounding area display system includes a plurality of cameras 1 which are imaging devices for taking an image of a vehicle surrounding area, an ECU 2 (electronic control unit) which is the vehicle surrounding area image generation device, a vehicle traveling information detection unit 3, a sensor 4 for detecting an object around a vehicle, an object information detection unit 5, and a display unit 6.

As shown in FIG. 4, for example, the cameras 1 are attached to the front, rear, left, and right of a vehicle 7, and take images of the front, rear, left, and right areas of the vehicle 7. The imaging areas by the respective cameras 1 have overlapping portions. In the example shown in FIG. 4, an imaging area 10B by the camera 1 in the rear of the vehicle and an imaging area 10R by the camera 1 on the right side of the vehicle have an overlapping portion 10BR in a right rear area of the vehicle 7. In the case of including four cameras 1, there are four overlapping portions.

The ECU 2 generates an overhead image including the vehicle 7 and the vehicle surrounding area on the basis of a plurality of images of the vehicle surrounding area taken by the cameras 1. The functions of the ECU 2 will be described in detail later. The vehicle traveling information detection unit 3 acquires vehicle traveling information including the traveling direction and the speed of the vehicle 7, from the vehicle 7. Specifically, the vehicle traveling information detection unit 3 acquires vehicle information such as the current steering angle, speed, and gear information, from an engine control unit, and detects the traveling direction and the speed of the vehicle 7 on the basis of the vehicle information.

The sensor 4 is attached to the vehicle 7, detects an object 8 in the vehicle surrounding area, and acquires object information. For example, as shown in FIG. 4, sensors 4 are each provided between a camera 1 and a camera 1, and are each set such that a detection range by the sensor 4 includes the overlapping portion of the imaging areas of the two cameras 1. The type of each sensor 4 is not particularly limited, and a millimeter wave radar, a sonar which is an ultrasonic sensor, a camera, or the like is used.

The object information detection unit 5 acquires the object information including position information of the object 8 detected by the sensor 4, and detects the distance between the object 8 and the vehicle 7 on the basis of the position information. A sensor having the function of the object information detection unit 5 may be used. The display unit 6 displays the overhead image that is generated by the ECU 2 and that includes the vehicle 7 and the vehicle surrounding area. The display unit 6 is a general display and is installed in the vehicle interior such that the driver can easily see the display unit 6.

As shown in FIG. 2, the ECU 2 includes a frame synchronization unit 21, an object distance determination unit 22, a combining method selection unit 23, an image conversion unit 24, a road surface color detection unit 25, an image division unit 26, and an image combining unit 27. Hereinafter, the functions of the respective units will be described.

The frame synchronization unit 21 synchronizes image information acquired from the cameras 1, the object information acquired from the object information detection unit 5, and the vehicle traveling information including the traveling direction and the speed of the vehicle 7. The vehicle traveling information is detected by the vehicle traveling information detection unit 3. Frame synchronization is one of the signal synchronization methods, and, in the frame synchronization, synchronization is performed according to a predetermined frame synchronization pattern. The object distance determination unit 22, the combining method selection unit 23, and the image conversion unit 24 each perform processing using the information synchronized by the frame synchronization unit 21.

The object distance determination unit 22 determines whether the distance between the object 8 and the vehicle 7 is within a threshold, on the basis of the object information acquired from the object information detection unit 5. Whether the object 8 is displayed in the overhead image displayed on the display unit 6 depends on the position of the object 8 and the distance between the object 8 and the vehicle 7. Therefore, the threshold used in the object distance determination unit 22 is set on the basis of the distance from an end portion of the vehicle 7 in the overhead image shown in FIG. 4 to a screen edge 6A (indicated by an alternate long and short dash line in FIG. 4) of the display unit 6.

The combining method selection unit 23 selects a combining method for an overhead image in the image combining unit 27 on the basis of the frame-synchronized image information, object information, and vehicle traveling information. In Embodiment 1, when the object 8 exists in the overlapping portion of the imaging areas of two cameras 1, and the distance between the object 8 and the vehicle 7 is within the threshold, the combining method selection unit 23 selects a first combining method. On the other hand, when no object 8 exists in the overlapping portion or when the distance between the object 8 and the vehicle 7 is larger than the threshold, the combining method selection unit 23 selects a second combining method. The first combining method and the second combining method will be described in detail later.

The image conversion unit 24 acquires image information of a plurality of images taken by the cameras 1, from the frame synchronization unit 21, and converts each image into an image for an overhead image. When the combining method selection unit 23 selects the first combining method, the images for an overhead image obtained by the image conversion unit 24 are sent to the road surface color detection unit 25 and the image combining unit 27. In addition, when the combining method selection unit 23 selects the second combining method, the images for an overhead image obtained by the image conversion unit 24 are sent only to the image combining unit 27.

The road surface color detection unit 25 detects the road surface color of the overlapping portion in each image for an overhead image generated by the image conversion unit 24. Specifically, when the combining method selection unit 23 selects the first combining method, the road surface color detection unit 25 cuts out the overlapping portion from each of the two images for an overhead image that have the overlapping portion, and detects the road surface color of the cut image.

As a method for detecting a road surface color, there is a method in which color information of an image portion (for example, several pixels around the vehicle 7) in which a road surface is seen is detected from the image information acquired by the cameras 1, and this color information is used as color information of a road surface color. Also, there is a method in which position information of an object is acquired from the object information detection unit 5, color information of a portion where no object exists is acquired on the basis of the position information, and this color information is used as color information of a road surface color.

When the object 8 exists in the overlapping portion of the imaging areas of multiple cameras 1, the image division unit 26 divides the overlapping portion in each image for an overhead image into a road surface image and an object image. When the combining method selection unit 23 selects the first combining method, the image division unit 26 divides the overlapping portion in each image for an overhead image into a road surface image and an object image on the basis of the color information of the road surface color detected by the road surface color detection unit 25. That is, in the image division unit 26, two pairs of a road surface image and an object image are obtained for one overlapping portion.

In a method for dividing an image by the image division unit 26, for example, the image division unit 26 searches for pixels that match the color information of the road surface color, from the overlapping portion in the image for an overhead image, and distinguishes between an object portion and a road surface portion. The image division unit 26 cuts out the pixels of the object portion as an object image, and fills this portion with the pixels that match the color information of the road surface color, thereby generating a road surface image.

In Embodiment 1, the image division unit 26 divides the overlapping portion in the image into a road surface image and an object image on the basis of the color information of the road surface color, but the method for dividing an image is not limited thereto. For example, as another method, a method, in which the coordinates of the object portion in the overlapping portion are calculated on the basis of the position information of the object 8 acquired by the object information detection unit 5 and the overlapping portion is divided into a road surface image and an object image, may be used.

The image combining unit 27 combine all or part of the image for an overhead image obtained by the image conversion unit 24 and the road surface image and the object image respectively obtained by the image division unit 26, to generate an overhead image. The image combining unit 27 generates an overhead image by either the first combining method or the second combining method.

In the first combining method, the images for an overhead image obtained by the image conversion unit 24 and the road surface image and the object image respectively obtained by the image division unit 26 are combined to generate an overhead image. When the first combining method is selected, since the object 8 exists in the overlapping portion of the imaging areas, two pairs of a road surface image and an object image obtained by the image division unit 26 are combined for the overlapping portion, and the images for an overhead image obtained by the image conversion unit 24 are combined for the other portion. In addition, in the second method, only the images for an overhead image obtained by the image conversion unit 24 are combined to generate an overhead image.

The ECU 2 is an electronic circuit including a microcomputer and the like, and is composed of a processor 100 and a storage device 101 as shown in FIG. 3. The storage device 101 includes a volatile storage device such as a random access memory, and a non-volatile auxiliary storage device such as a flash memory. Moreover, the storage device 101 may include an auxiliary storage device that is a hard disk, instead of the flash memory.

The processor 100 executes a program inputted from the storage device 101. In this case, the program is inputted from the auxiliary storage device via the volatile storage device to the processor 100. In addition, the processor 100 may output data such as a calculation result to the volatile storage device of the storage device 101, or may store the data in the auxiliary storage device via the volatile storage device.

Moreover, the vehicle traveling information detection unit 3 and the object information detection unit 5 are similarly composed of a processor and a storage device installed in the vehicle surrounding area display system (not shown). A program that describes the functions of the vehicle traveling information detection unit 3 and the object information detection unit 5 is executed by the processor.

Next, the combining method for an overhead image by the ECU 2 will be described in detail with reference to FIG. 4 and FIG. 5. In FIG. 4, the object 8 exists in the overlapping portion 10BR of the imaging area 10B by the camera 1 in the rear of the vehicle and the imaging area 10R by the camera 1 on the right side of the vehicle. In addition, the object 8 is located inside the screen edge 6A of the display unit 6, and thus the object distance determination unit 22 determines that the distance between the object 8 and the vehicle 7 is within the threshold. Therefore, the combining method selection unit 23 selects the first combining method.

When the first combining method is selected, the image conversion unit 24 cuts out the image of a section 11 in which the object 8 is detected, from the image taken by each camera 1, and converts the cut image into an image for an overhead image. Alternatively, the image conversion unit 24 may convert the image taken by each camera 1 into an image for an overhead image and then cut out the image of the section 11 in which the object 8 is detected. As a result, as shown in FIG. 5, an overhead image 11a of the section 11 taken by the camera 1 in the rear of the vehicle and an overhead image 11b of the section 11 taken by the camera 1 on the right side of the vehicle are obtained. These overhead images 11a and 11b each include the object 8 and a road surface 12.

Subsequently, the road surface color detection unit 25 detects color information of the road surface color in each of the overhead images 11a and 11b. The image division unit 26 extracts the object 8 from each of the overhead images 11a and 11b on the basis of the road surface color detected by the road surface color detection unit 25, and divides each of the overhead images 11a and 11b into a road surface image including the road surface 12 and an object image including the object 8. The image combining unit 27 performs image combination by alpha blending using these two pairs of the road surface image and the object image.

In the first combining method, as shown in FIG. 5, combination is performed with each of the overhead images 11a and 11b being divided into four areas. The first area is an area that is the road surface image in both the overhead images 11a and 11b. For the first area, each α value is set to 0.5. The second area is an area that is the object image in the overhead image 11a and is the road surface image in the overhead image 11b. For the second area, an α value for the object image is set to 1, and an α value for the road surface image is set to 0.

The third area is an area that is the road surface image in the overhead image 11a and is the object image in the overhead image 11b. For the third area, an α value for the object image is set to 1, and an α value for the road surface image is set to 0. The fourth area is an area that is the object image in both the overhead images 11a and 11b. For the fourth area, each α value is set to 0.5. For the first area and the fourth area, setting of the α value is not limited thereto.

As described above, in the first combining method, when the road surface image and the object image of the overlapping portion are combined, for the area that is the object image in one of the two pairs and is the road surface image in the other of the two pairs, the α value for the object image is set to 1, and the α value for the road surface image is set to 0. The road surface images and the object images of the four areas for each of which the α value is provided are combined to generate an overhead image 11c shown in FIG. 5. The following equation (1) is a general equation of alpha blending using an α value. In equation (1), Cg is color information of a road surface image, Co is color information of an object image, A is an α value, and Cr is color information after combination.

$$Cr = Cg \times (1-A) + Co \times A \tag{1}$$

In general alpha blending, the α value that is A in equation (1) is set between 0 and 1, and the colors of both images are mixed with the color of each image being made transparent. For example, when the α value is set to 0.5, an image in which the colors of both images are mixed to the same extent is generated. On the other hand, in the ECU 2 according to Embodiment 1, the α value for the object image is set to 1 for the second area and the third area shown in FIG. 5, and combination is performed without making the colors of the object images transparent.

Figure 6:
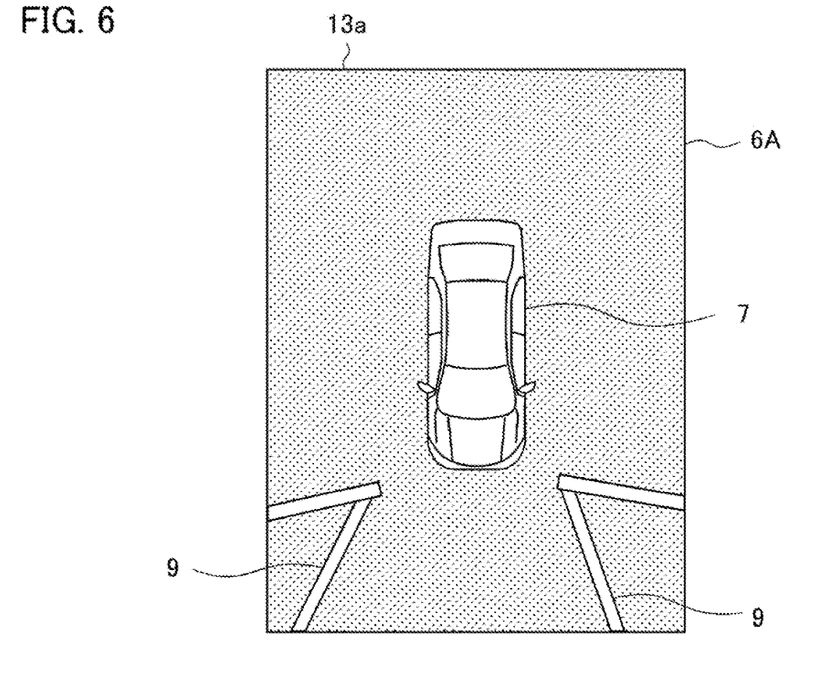
FIG. 6 is a diagram showing an example of an overhead image displayed on a display unit of the vehicle surrounding area display system according to Embodiment 1.

FIG. 6 shows an example of an overhead image displayed on the display unit of the vehicle surrounding area display system according to Embodiment 1. An overhead image 13a is obtained by dividing the images of the overlapping portion into two pairs of a road surface image and an object image and performing combination with the α value for the object image being set to 1 and the α value for the road surface image being set to 0 for the area that is the object image in one of the two pairs and is the road surface image in the other of the two pairs. In the overhead image 13a displayed on the display unit 6, rod-shaped objects 9 are clearly seen in front of the vehicle 7 without blurring.

Figure 7:
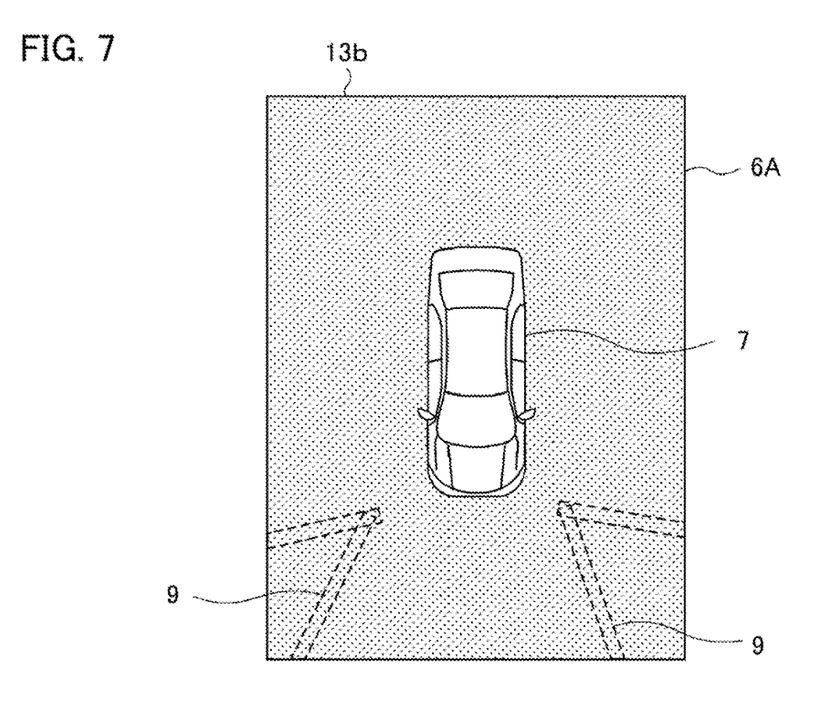
FIG. 7 is a diagram showing an example of an overhead image displayed on a display unit of a vehicle surrounding area display system according to a comparative example.

Meanwhile, FIG. 7 shows an example of an overhead image displayed on a display unit of a vehicle surrounding area display system according to a comparative example. In the comparative example, images for an overhead image by two cameras 1 are combined with each α value being set to 0.5 without dividing each image of an overlapping portion into a road surface image and an object image. Thus, the colors of object portions of two images for an overhead image are each made transparent by 50%, and rod-shaped objects 9 seen in an overhead image 13b are blurred.

Figure 8:
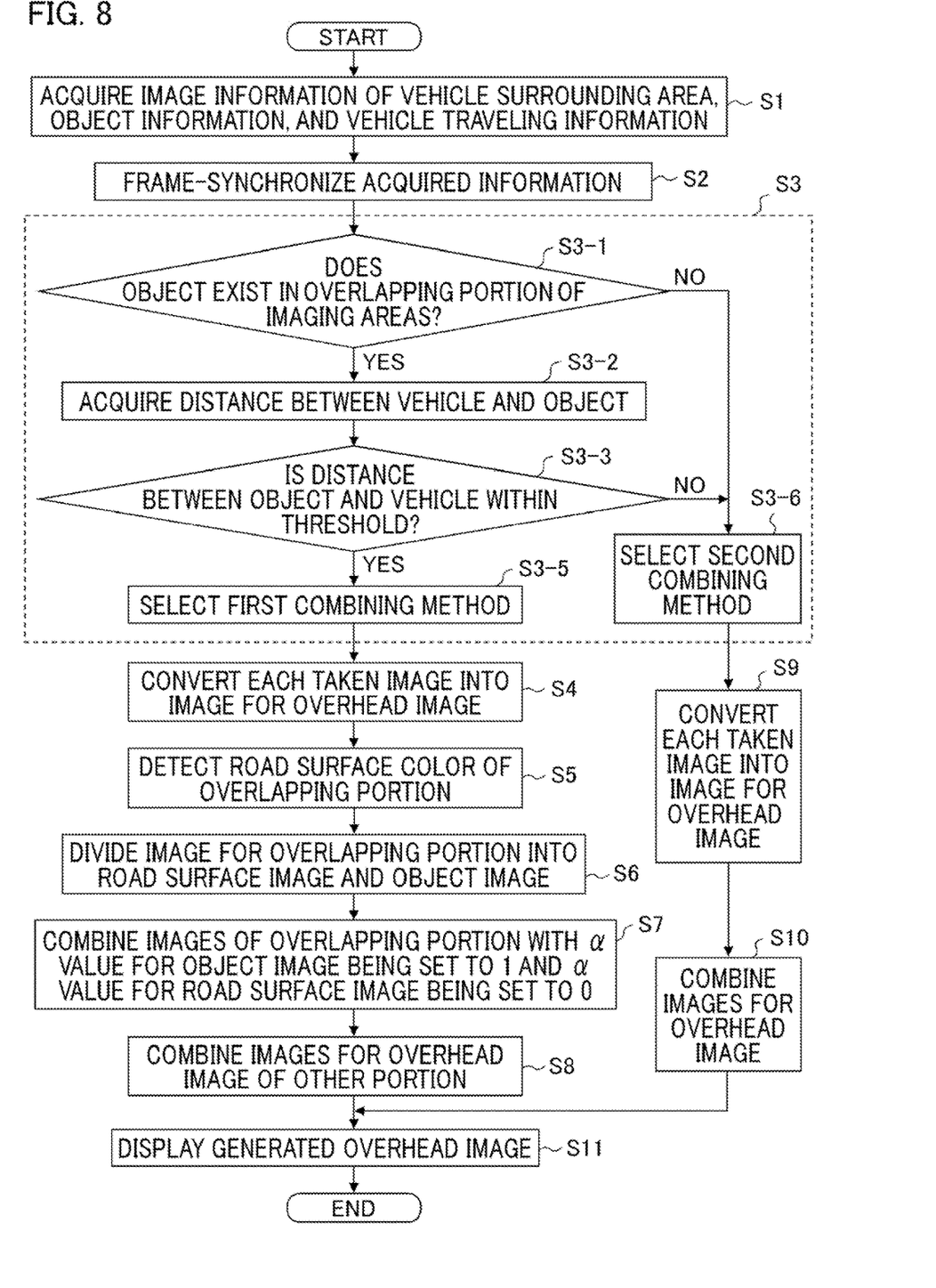
FIG. 8 is a diagram illustrating flow of processing by the vehicle surrounding area display system according to Embodiment 1.

Next, flow of processing by the vehicle surrounding area display system according to Embodiment 1 will be described with reference to a flowchart of FIG. 8. First, in step S1, image information of a plurality of taken images of the vehicle surrounding area, object information including position information of an object in the vehicle surrounding area, and vehicle traveling information including the traveling direction and the speed of the vehicle are acquired (information acquisition step). Subsequently, in step S2, the information acquired in step S1 is frame-synchronized (frame synchronization step).

In step S3, a combining method for an overhead image is selected on the basis of the information obtained in step S1 and frame-synchronized in step S2 (combining method selection step). First, in step S3-1, whether an object exists in the overlapping portion of the imaging areas in the plurality of taken images of the vehicle surrounding area is determined. When an object exists in the overlapping portion (YES), the distance between the vehicle and the object is acquired in step S3-2. Next, in step S3-3, whether the distance between the object and the vehicle is within the threshold is determined. When the distance between the object and the vehicle is within the threshold (YES), the first combining method is selected in step S3-5.

On the other hand, when no object exists in the overlapping portion in step S3-1 (NO), or when the distance between the object and the vehicle is larger than the threshold in step S3-3 (NO), the second combining method is selected in step S3-6.

When the first combining method is selected in step S3-5, each of the plurality of taken images is converted into an image for an overhead image in step S4 (image conversion step). Next, in step S5, the road surface color of the overlapping portion in each image for an overhead image is detected (road surface color detection step). Furthermore, in step S6, the overlapping portion in each image for an overhead image is divided into a road surface image and an object image on the basis of the road surface color detected in the road surface color detection step (S5) (image division step).

Subsequently, in step S7, using the images of the overlapping portion obtained in the image division step (S6), that is, two pairs of the object image and the road surface image, the images are combined with an α value for the object image being set to 1 and an α value for the road surface image being set to 0 for an area that is the object image in one of the two pairs and is the road surface image in the other of the two pairs, to generate an overhead image of the overlapping portion. Next, in step S8, the images for an overhead image of the other portion obtained in the image conversion step (S4) are combined to generate an overhead image including the vehicle and the vehicle surrounding area (image combining step).

On the other hand, when the second combining method is selected in step S3-6, each of the plurality of taken images is converted into an image for an overhead image in step S9 (image conversion step). Subsequently, in step S10, the images for an overhead image obtained in the image conversion step (S9) are combined to generate an overhead image including the vehicle and the vehicle surrounding area (image combining step). Finally, in step S11, the overhead image generated in the image combining step (S7, S8, S10) is displayed (display step).

As described above, in the ECU 2 according to Embodiment 1, when the object 8 exists in the overlapping portion of the imaging areas of multiple cameras 1, the overlapping portion is divided into a road surface image and an object image, and combination is performed by alpha blending with an α value for the object image being set to 1 and an α value for the road surface image being set to 0, to generate an overhead image. Thus, it is possible to generate a clear overhead image without blurring the object 8 existing in the overlapping portion. In addition, with the vehicle surrounding area display system including the ECU 2 according to Embodiment 1, it is possible to display a clear overhead image without blurring the object 8 existing in the overlapping portion.

Moreover, in the vehicle surrounding area display method according to Embodiment 1, when the object 8 exists in the overlapping portion of a plurality of images and the distance between the object 8 and the vehicle 7 is within the threshold, the road surface color of the overlapping portion of each image for an overhead image is detected, the overlapping portion is divided into a road surface image and an object image on the basis of the road surface color, and the image for an overhead image, the road surface image, and the object image are combined to generate an overhead image. Thus, it is possible to display a clear overhead image without blurring the object 8 existing in the overlapping portion.

Embodiment 2

Figure 9:
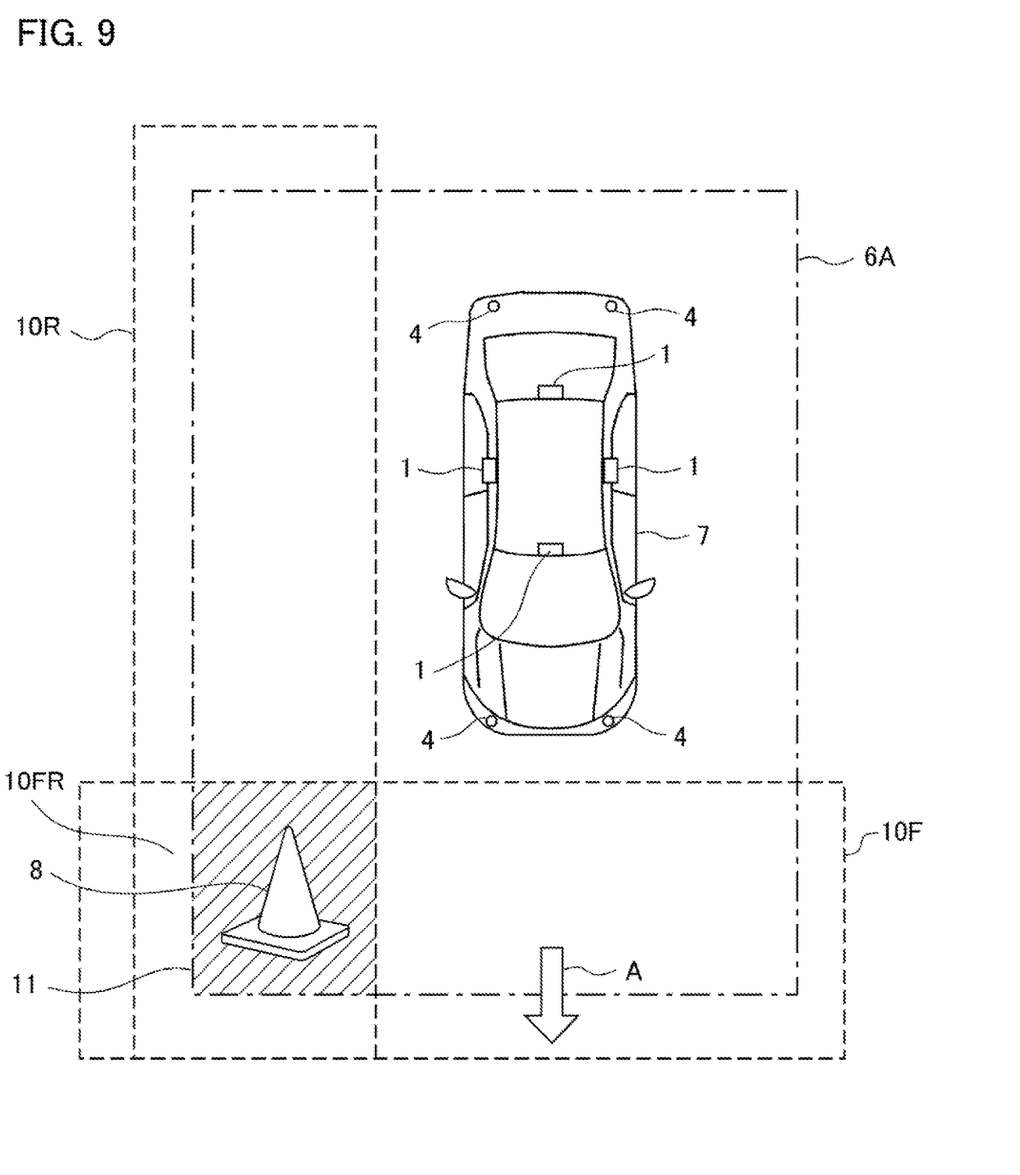
FIG. 9 is a diagram illustrating a method for selecting an image combining method by a vehicle surrounding area image generation device according to Embodiment 2.
Figure 10:
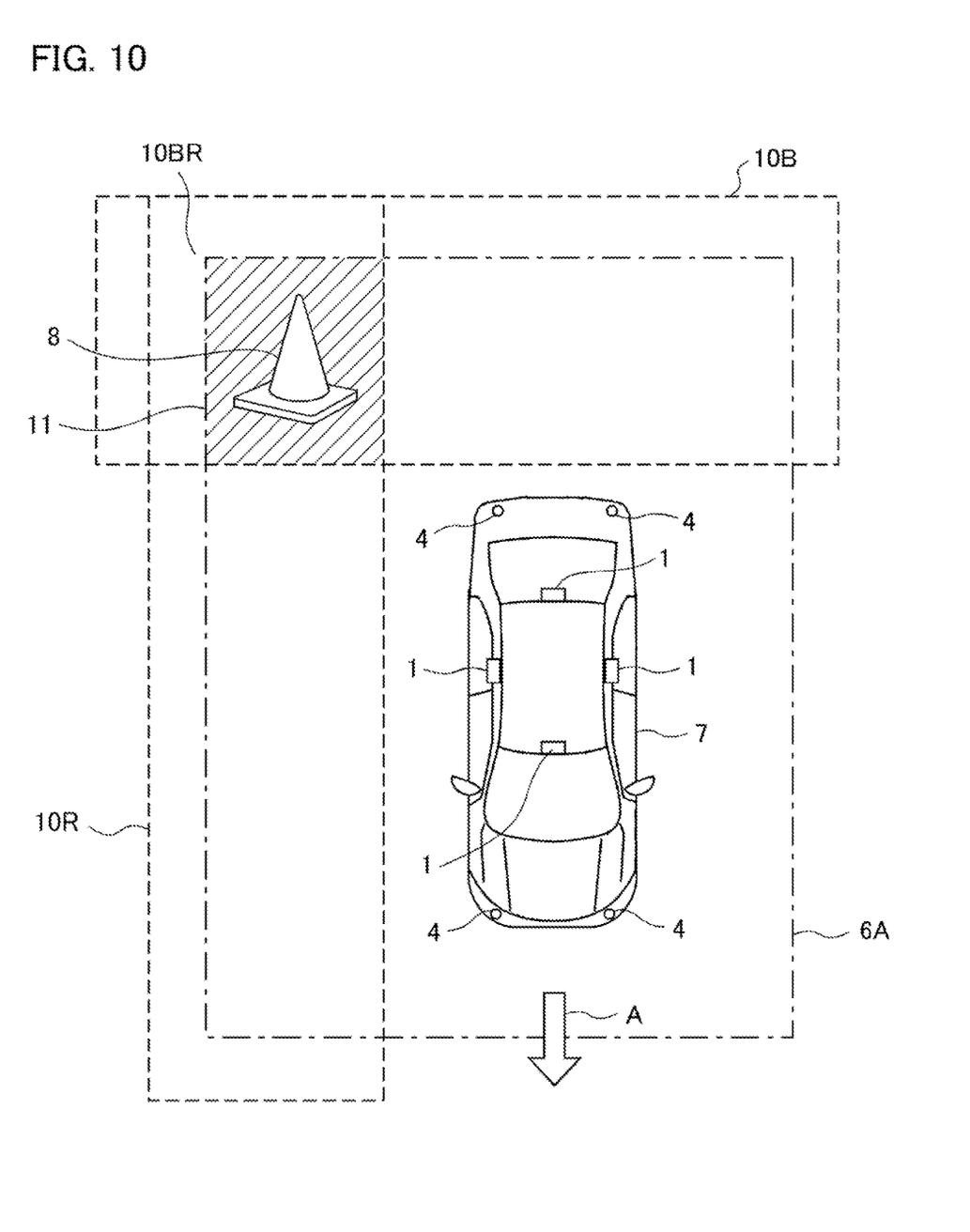
FIG. 10 is a diagram illustrating the method for selecting an image combining method by the vehicle surrounding area image generation device according to Embodiment 2.

The configurations of a vehicle surrounding area image generation device and a vehicle surrounding area display system according to Embodiment 2 are the same as in Embodiment 1 described above. Thus, FIG. 1 and FIG. 2 are used again, and only the differences will be described here. FIG. 9 and FIG. 10 are diagrams illustrating a method for selecting an image combining method by the vehicle surrounding area image generation device according to Embodiment 2. In FIG. 9 and FIG. 10, an arrow A indicates the traveling direction of the vehicle 7.

In FIG. 9, an object 8 exists in a section 11 of an overlapping portion 10FR of an imaging area 10F by the camera 1 in the front of the vehicle and the imaging area 10R by the camera 1 on the right side of the vehicle. In addition, in FIG. 10, an object 8 exists in the section 11 of the overlapping portion 10BR of the imaging area 10B by the camera 1 in the rear of the vehicle and the imaging area 10R by the camera 1 on the right side of the vehicle.

In any of these cases, the object 8 is located inside the screen edge 6A of the display unit 6, and the distance between the object 8 and the vehicle is within the threshold, but the relationship between the position of the object 8 and the traveling direction of the vehicle 7 are different between these cases. That is, in FIG. 9, the object 8 exists on the traveling direction side of the vehicle 7, so that the vehicle 7 is highly likely to come into contact with the object 8. On the other hand, in FIG. 10, the object 8 exists on the opposite side from the traveling direction of the vehicle 7, so that the vehicle 7 is unlikely to come into contact with the object 8.

When the object 8 exists in the overlapping portion, the distance between the object 8 and the vehicle 7 is within the threshold, and the object 8 exists in the traveling direction of the vehicle 7, the combining method selection unit 23 according to Embodiment 2 selects the first combining method in which an image for an overhead image, a road surface image, and an object image are used. On the other hand, when no object 8 exists in the overlapping portion, when the distance between the object 8 and the vehicle 7 is larger than the threshold, or when no object 8 exists in the traveling direction of the vehicle 7, the combining method selection unit 23 selects the second combining method in which an image for an overhead image is used.

In Embodiment 1 described above, even when the object 8 exists on the opposite side from the traveling direction of the vehicle 7 as in FIG. 10, the first combining method is selected, so that the calculation load of the ECU 2 is increased. In Embodiment 2, when the object 8 exists on the opposite side from the traveling direction of the vehicle 7, the second combining method is selected, so that the object 8 is blurred in a generated overhead image. However, the object 8 that exists on the opposite side from the traveling direction is less likely to come into contact with the vehicle 7, and thus does not need to be so clear.

Figure 11:
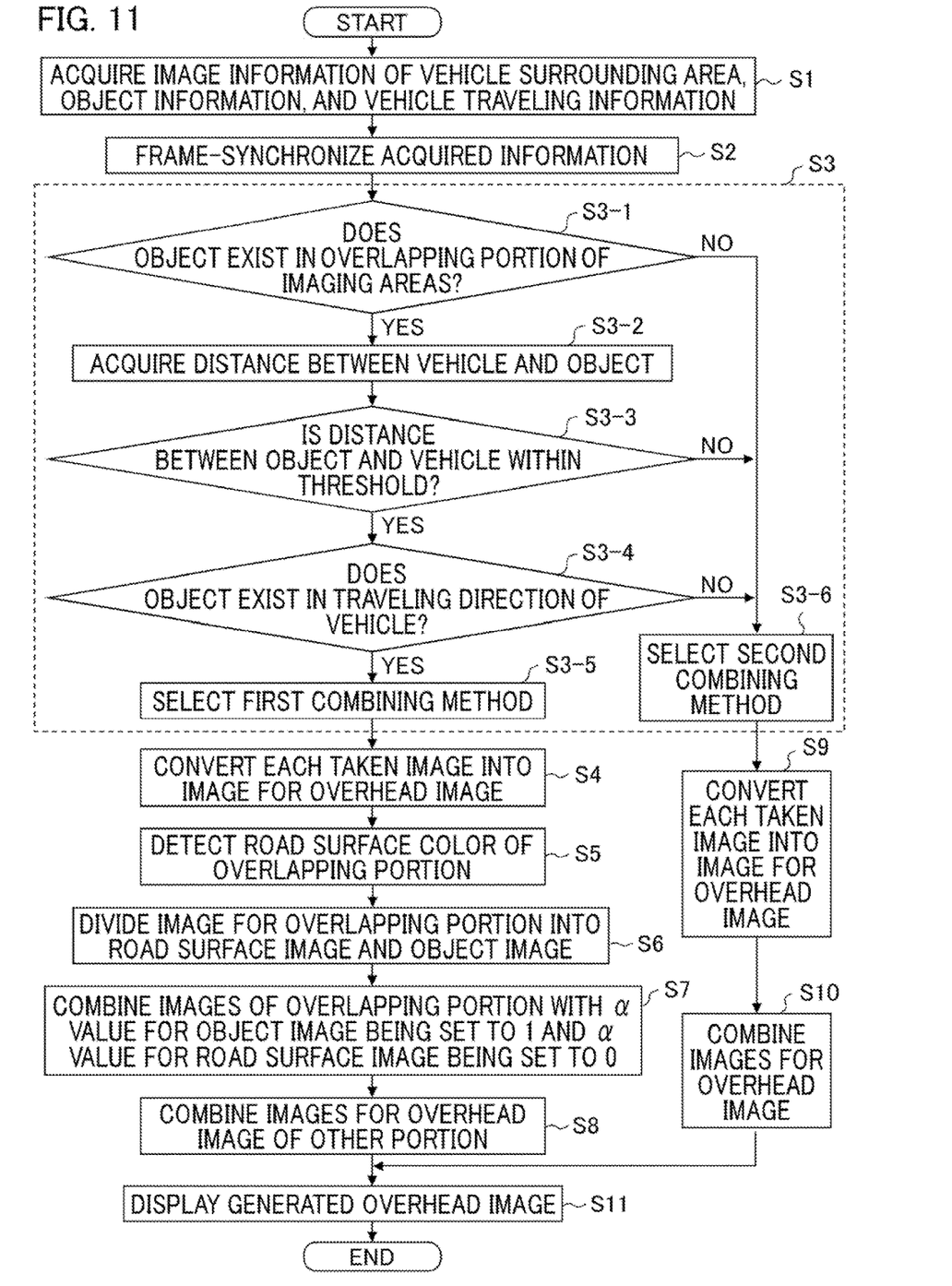
FIG. 11 is a diagram illustrating flow of processing by a vehicle surrounding area display system according to Embodiment 2.

FIG. 11 is a flowchart illustrating flow of processing by the vehicle surrounding area display system according to Embodiment 2. The difference between FIG. 11 and the flowchart of FIG. 8 described above in Embodiment 1 is only that step S3-4 is added to the combining method selection step (S3). That is, steps S1, S2, and S4 to S11 are the same as in the flowchart of FIG. 8, and thus the description thereof is omitted.

In the combining method selection step (S3) according to Embodiment 2, when an object exists in the overlapping portion of the imaging areas in step S3-1 (YES), the distance between the vehicle and the object is acquired in step S3-2. Next, when the distance between the object and the vehicle is within the threshold in step S3-3 (YES), whether the object exists in the traveling direction of the vehicle is determined in step S3-4. When the object exists in the traveling direction of the vehicle (YES), the first combining method is selected in step S3-5.

On the other hand, when no object exists in the overlapping portion in step S3-1 (NO), when the distance between the object and the vehicle is larger than the threshold in step S3-3 (NO), or when the object does not exist in the traveling direction of the vehicle in step S3-4 (NO), the second combining method is selected in step S3-6.

In Embodiment 2, in addition to the same effects as those of Embodiment 1 described above, the calculation load of the ECU 2 is reduced since the first combining method is selected only when it is determined that the object 8 exists in the traveling direction of the vehicle 7.

Although the present disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 camera
2 ECU
3 vehicle traveling information detection unit
4 sensor
5 object information detection unit
6 display unit
6A screen edge
7 vehicle
8, 9 object
10B, 10F, 10R imaging area
10BR, 10FR overlapping portion
11 section
11a, 11b, 11c, 13a, 13b overhead image
12 road surface
21 frame synchronization unit
22 object distance determination unit
23 combining method selection unit
24 image conversion unit
25 road surface color detection unit
26 image division unit
27 image combining unit

The invention claimed is:

1. A vehicle surrounding area image generation device for generating an overhead image including a vehicle and a vehicle surrounding area, on the basis of a plurality of images taken by a plurality of imaging devices mounted on the vehicle, the vehicle surrounding area image generation device comprising:
    an object distance determining circuitry to determine whether a distance between an object and the vehicle is within a threshold, on the basis of object information acquired by a sensor for detecting the object in the vehicle surrounding area;
    an image converting circuitry to convert each of the plurality of images into an image for an overhead image;
    an image dividing circuitry to divide an overlapping portion in the image for an overhead image into a road surface image and an object image when the object exists in said overlapping portion of imaging areas of the plurality of imaging devices; and
    an image combining circuitry to combine all or part of the image for an overhead image obtained by the image converting circuitry and the road surface image and the object image obtained by the image dividing circuitry respectively, to generate the overhead image.

2. The vehicle surrounding area image generation device according to claim 1, further comprising a frame synchronizing circuitry to synchronize image information acquired from the imaging devices, object information acquired from the sensor, and vehicle traveling information including a traveling direction and a speed of the vehicle.

3. The vehicle surrounding area image generation device according to claim 2, further comprising a combining method selecting circuitry to select a combining method for the overhead image in the image combining circuitry on the basis of the image information, the object information, and the vehicle traveling information synchronized by the frame synchronizing circuitry.

4. The vehicle surrounding area image generation device according to claim 3, wherein
when the object exists in the overlapping portion and the distance between the object and the vehicle is within the threshold, the combining method selecting circuitry selects a first combining method in which the image for an overhead image, the road surface image, and the object image are used, and
when the object does not exist in the overlapping portion or when the distance between the object and the vehicle is larger than the threshold, the combining method selecting circuitry selects a second combining method in which the image for an overhead image is used.

5. The vehicle surrounding area image generation device according to claim 4, wherein
when the object exists in the traveling direction of the vehicle, the combining method selecting circuitry selects the first combining method, and
when the object does not exist in the traveling direction of the vehicle, the combining method selecting circuitry selects the second combining method.

6. The vehicle surrounding area image generation device according to claim 1, further comprising a road surface color detector to detect a road surface color of the overlapping portion, wherein
the image dividing circuitry divides the overlapping portion into the road surface image and the object image on the basis of the road surface color detected by the road surface color detector.

7. The vehicle surrounding area image generation device according to claim 1, wherein
the image combining circuitry performs image combination by alpha blending, and
when the object exists in the overlapping portion, the image combining circuitry uses two pairs of the road surface image and the object image obtained by the image dividing circuitry, and sets an α value for the object image to 1 and sets an α value for the road surface image to 0 for an area that is the object image in one of the two pairs and is the road surface image in the other of the two pairs.

8. The vehicle surrounding area image generation device according to claim 1, wherein the threshold used in the object distance determining circuitry is set on the basis of a distance from an end portion of the vehicle in the overhead image to a screen edge of a display on which the overhead image is displayed.

9. A vehicle surrounding area display system comprising: a plurality of imaging devices, mounted on a vehicle, for taking an image of a vehicle surrounding area; a sensor for detecting an object in the vehicle surrounding area; a vehicle surrounding area image generation device for generating an overhead image including the vehicle and the vehicle surrounding area, on the basis of a plurality of images taken by the imaging devices; and a display for displaying the overhead image generated by the vehicle surrounding area image generation device, wherein
the vehicle surrounding area image generation device includes
an object distance determining circuitry to determine whether a distance between the object and the vehicle is within a threshold, on the basis of object information acquired by the sensor,
an image converting circuitry to convert each of the plurality of images into an image for an overhead image,
an image dividing circuitry to divide an overlapping portion in the image for an overhead image into a road surface image and an object image when the object exists in said overlapping portion of imaging areas of the plurality of imaging devices, and
an image combining circuitry to combine all or part of the image for an overhead image obtained by the image converting circuitry and the road surface image and the object image obtained by the image dividing circuitry respectively, to generate the overhead image.

10. The vehicle surrounding area display system according to claim 9, further comprising a vehicle traveling information detector to acquire vehicle traveling information including a traveling direction and a speed of the vehicle, from the vehicle.

11. The vehicle surrounding area display system according to claim 9, wherein the sensor is a millimeter wave radar, a sonar, or a camera, and a detection range by the sensor includes the overlapping portion.

12. A vehicle surrounding area display method for generating and displaying an overhead image including a vehicle and a vehicle surrounding area, the vehicle surrounding area display method comprising:
acquiring image information of a plurality of taken images of the vehicle surrounding area, object information including position information of an object in the vehicle surrounding area, and vehicle traveling information including a traveling direction and a speed of the vehicle;
converting each of the acquired plurality of images into an image for an overhead image;
detecting a road surface color of an overlapping portion when the object exists in said overlapping portion of the plurality of images and a distance between the object and the vehicle is within a threshold;
dividing the overlapping portion in the image for an overhead image into a road surface image and an object image on the basis of the detected road surface color;
combining all or part of the image for an overhead image and the road surface image and the object image, to generate the overhead image; and
displaying the generated overhead image.

13. The vehicle surrounding area display method according to claim 12, further comprising
selecting a combining method for the overhead image on the basis of the image information of a plurality of taken images of the vehicle surrounding area, object information including position information of an object in the vehicle surrounding area, and vehicle traveling information including a traveling direction and a speed of the vehicle.

14. The vehicle surrounding area display method according to claim 13, wherein, a first combining method in which the image for an overhead image, the road surface image, and the object image are used is selected when the object exists in the overlapping portion, the distance between the object and the vehicle is within the threshold, and the object exists in the traveling direction of the vehicle.

15. The vehicle surrounding area display method according to claim 13, wherein, a second combining method in which the image for an overhead image is used is selected when the object does not exist in the overlapping portion, when the distance between the object and the vehicle is larger than the threshold, or when the object does not exist in the traveling direction of the vehicle.

16. The vehicle surrounding area display method according to claim 12, wherein, image combination is performed by alpha blending, and when the object exists in the overlapping portion, two pairs of the road surface image and the object image are used, and an α value for the object image is set to 1 and an α value for the road surface image is set to 0 for an area that is the object image in one of the two pairs and is the road surface image in the other of the two pairs.

* * * * *